United States Patent
Im et al.

(10) Patent No.: US 7,468,628 B2
(45) Date of Patent: Dec. 23, 2008

(54) INTERNAL VOLTAGE GENERATORS FOR SEMICONDUCTOR MEMORY DEVICE

(75) Inventors: Jae Hyuk Im, Icheon-si (KR); Jae Jin Lee, Icheon-si (KR)

(73) Assignee: Hynix Semiconductor Inc., Icheon-si (KR)

( * ) Notice: Subject to any disclaimer, the term of this patent is extended or adjusted under 35 U.S.C. 154(b) by 155 days.

(21) Appl. No.: 11/623,396

(22) Filed: Jan. 16, 2007

(65) Prior Publication Data

US 2007/0109059 A1    May 17, 2007

Related U.S. Application Data (63) Continuation-in-part of application No. 11/114,372, filed on Apr. 26, 2005, now abandoned.

(30) Foreign Application Priority Data

Nov. 8, 2004    (KR) ................. 2004-90256

(51) Int. Cl.
G05F 1/00 (2006.01)
H03B 5/24 (2006.01)
(52) U.S. Cl. ................ 327/548; 327/535; 327/536; 331/57; 331/173
(58) Field of Classification Search ........... 327/548, 327/536, 535, 534–537; 365/185.18; 331/57, 331/173, 150, 185, 186
See application file for complete search history.

(56) References Cited

U.S. PATENT DOCUMENTS

| 6,259,612 | B1 * | 7/2001 | Itoh ............................. 363/60 |
| 6,281,742 | B1 * | 8/2001 | Sung ........................... 327/535 |
| 6,756,805 | B2 * | 6/2004 | Sher et al. ................... 324/765 |
| 2006/0097804 | A1 | 5/2006 | Im et al. |
| 2006/0220729 | A1 * | 10/2006 | Kim ............................ 327/536 |

FOREIGN PATENT DOCUMENTS

| JP | 2000-040362 | 2/2000 |
| KP | 1020030037592 | 5/2003 |
| KR | 2001-0029599 A | 4/2001 |

\* cited by examiner

*Primary Examiner*—Joseph Chang
(74) *Attorney, Agent, or Firm*—Marshall, Gerstein & Borun LLP (57) ABSTRACT

An internal voltage generator capable of reducing the variation width in the level of an internal voltage VPP, by performing charge pumping only a predetermined number of times in a period where an oscillator driving signal is at a logic HIGH level, and then stopping the charge pumping operation. The oscillator controller generates an oscillation control signal for stopping an oscillation operation of a ring oscillator by using an output signal of a level detector and an output signal of the ring oscillator. The ring oscillator does not generate an oscillation signal at a predetermined time point where an output signal of the level detector is at a HIGH level in response to the oscillation control signal. The charge pump circuit generates an internal voltage by performing a charge pumping operation only predetermined times in response to the oscillation signal, and then stopping the charge pumping operation.

22 Claims, 5 Drawing Sheets

INTERNAL VOLTAGE GENERATORS FOR SEMICONDUCTOR MEMORY DEVICE

CROSS-REFERENCE TO RELATED APPLICATION

This patent is a continuation-in-part of U.S. Ser. No. 11/114,372, filed Apr. 26, 2005, the disclosure of which is hereby expressly incorporated herein for all purposes.

TECHNICAL FIELD

An internal voltage generator for generating a high voltage VPP or a substrate voltage in a semiconductor memory device is shown and described.

DESCRIPTION OF THE RELATED ART

As semiconductor memory devices become faster and lower in power usage, internal operation becomes very sensitive to noise. Semiconductor memory, particularly DRAM devices, usually include an internal voltage generator for generating an internal voltage of a predetermined level for the internal operation in addition to an external input voltage. An internal voltage generator can generate a voltage higher than an external high voltage, i.e., a high voltage VPP, or a voltage lower than an external low voltage (usually, ground voltage), i.e., a back bias voltage or a substrate voltage. An internal voltage generator generates an internal voltage of a predetermined level by employing a charge pumping mode.

Figure 1:
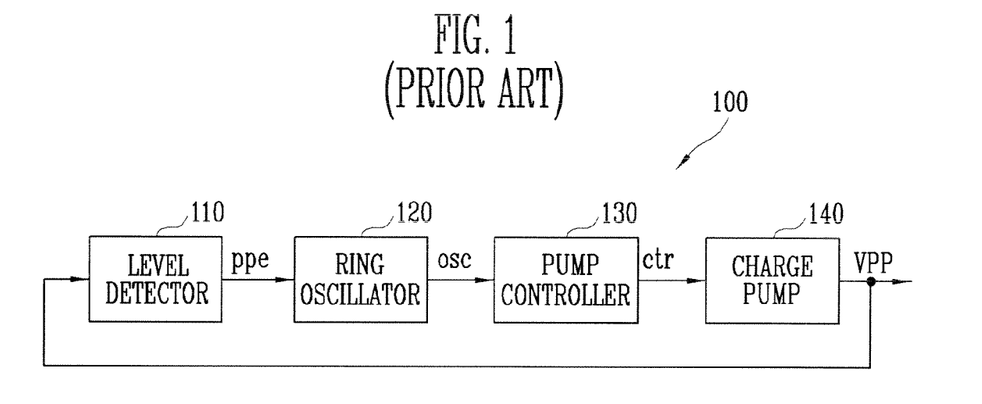
FIG. 1 is a block diagram illustrating the configuration of a conventional internal voltage generator.

FIG. 1 is a block diagram illustrating the configuration of a conventional internal voltage generator. The internal voltage generator 100 includes a level detector 110, a ring oscillator 120, a pump controller 130 and a charge pump 140.

The level detector 110 detects the level of the internal voltage VPP to generate an oscillator driving signal ppe. The ring oscillator 120 generates an oscillation signal osc using the oscillator driving signal ppe. The pump controller 130 generates a pump control signal ctr using the oscillation signal osc. The charge pump 140 generates the internal voltage VPP in response to the pump control signal ctr.

Such a conventional internal voltage generator 100 has only one oscillator driving signal ppe capable of controlling the operation of the ring oscillator 120. That is, if a period where the oscillator driving signal ppe is at a HIGH level is decided, the oscillation signal osc of the ring oscillator 120 is generated only in said period.

In this case, if current consumption of the level detector 110 is reduced in order to reduce current consumption in a standby operation, a driving current is also reduced to reduce the response speed of the level detector 110.

If a response time of the level detector 110 and the period where the oscillator driving signal ppe having a HIGH level are fixed in accordance with an active operation, the ring oscillator 120 continues generating the oscillation signal osc because the oscillator driving signal ppe is at the HIGH level although it becomes necessary to stop charge pumping because the internal voltage VPP rises to a target level. In this case, there is a problem in that the voltage level of the internal voltage VPP undesirably increases higher than the target level because the charge pumping operation continues.

Figure 2:
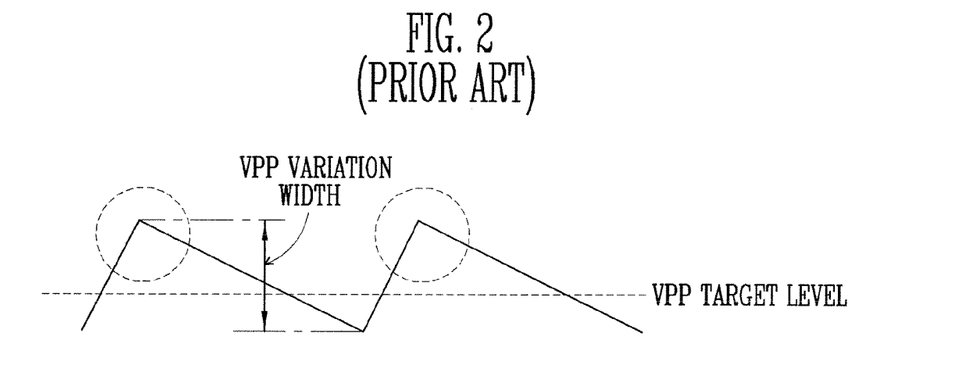
FIG. 2 is a waveform showing variation in the level of an internal voltage generated from the internal voltage generator shown in FIG. 1.

FIG. 2 is a waveform showing variation in the level of an internal voltage generated from the internal voltage generator shown in FIG. 1.

The conventional internal voltage generator continues to perform charge pumping due to a slow response speed of the level detector 110 at a time point where the pumping needs to be stopped since the charge pumping operation has been sufficiently performed. In this case, as shown in FIG. 2, there occurs a section where the internal voltage VPP rises over a target level like circles indicated by dotted lines. Accordingly, there is a problem in that the variation width in the level of the internal voltage VPP is greater.

SUMMARY OF THE DISCLOSURE

Accordingly, an internal voltage generator is disclosed which is capable of reducing the variation width in the level of an internal voltage VPP by performing charge pumping only a predetermined number of times even when an oscillator driving signal is at a logic HIGH level, and then stopping the charge pumping operation.

According to a first embodiment, an internal voltage generator comprises a level detector for detecting a voltage level of an internal voltage to generate an oscillator driving signal, a ring oscillator for generating an oscillation signal in response to the oscillator driving signal, an oscillator controller for generating an oscillation control signal for stopping an oscillation operation of the ring oscillator using the oscillator driving signal and the oscillation signal. and a charge pump circuit for performing charge pumping only predetermined number of times in response to the oscillation signal, thus generating an internal voltage, and then stopping the charge pumping operation, wherein the ring oscillator stops the oscillation operation even at a predetermined time point in a period where the oscillator driving signal is activated, in response to the oscillation control signal.

According to a second embodiment, an internal voltage generator comprises a level detector for detecting a level of an internal voltage, a ring oscillator for performing an oscillation operation, a charge pump circuit for performing a charge pumping operation to generate the internal voltage, and an oscillator controller for generating an oscillation control signal for stopping the oscillation operation of the ring oscillator by using an output signal of the level detector and an output signal of the ring oscillator such that the number of the charge pumping operation is limited to a target number after the output signal of the level detector is activated.

In the above, the charge pump performs the charge pumping operation as many as the number of times that the oscillation signal is generated, which is generated again according to the oscillator driving signal and the oscillation control signal.

DETAILED DESCRIPTION OF THE PRESENTLY PREFERRED EMBODIMENTS

Figure 3:
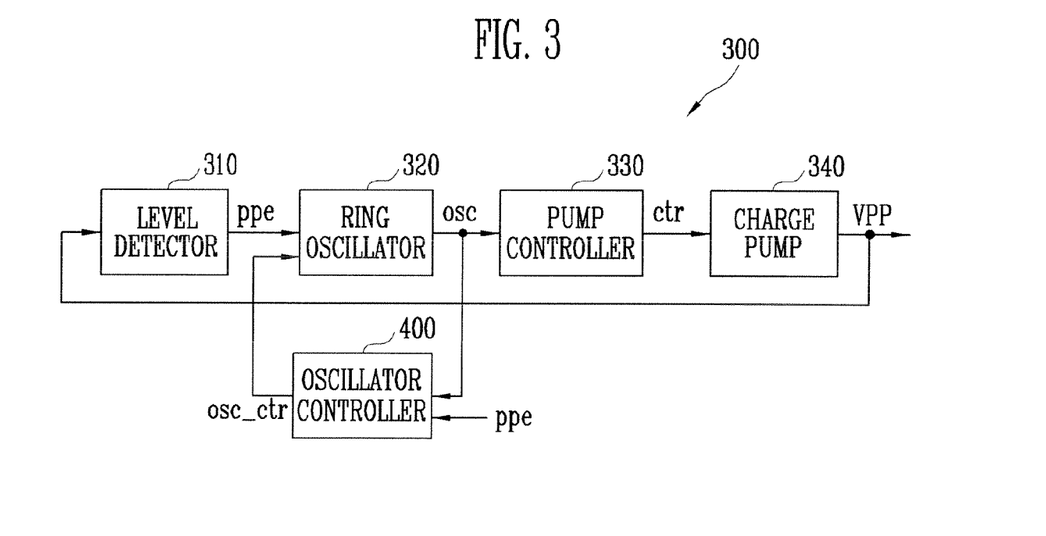
FIG. 3 is a block diagram illustrating the configuration of an internal voltage generator according to an embodiment.

FIG. 3 is a block diagram illustrating the configuration of a disclosed internal voltage generator. The internal voltage generator 300 includes a level detector 310, a ring oscillator 320, a pump controller 330, a charge pump 340 and an oscillator controller 400.

The level detector 310 detects the level of an internal voltage VPP to generate an oscillator driving signal ppe. The ring oscillator 320 generates an oscillation signal osc using the oscillator driving signal ppe. The oscillator controller 400 generates an oscillation control signal osc_ctr for stopping an oscillation operation at a predetermined time point using the oscillation signal osc, even when the oscillator driving signal ppe is at a HIGH level. The oscillation control signal osc_ctr generated thus is again input to the ring oscillator 320. The ring oscillator 350 does not generate the oscillation signal osc at a predetermined time point in a period where the oscillator driving signal ppe is at a HIGH level in response to the oscillation control signal osc_ctr. The pump controller 330 generates a pump control signal ctr using the oscillation signal osc. The charge pump 340 performs charge pumping only at a predetermined time or predetermined times in response to the pump control signal ctr, thus generating internal voltages VPP, and stops the charge pumping operation even when the oscillator driving signal ppe is at a HIGH level.

Figure 4:
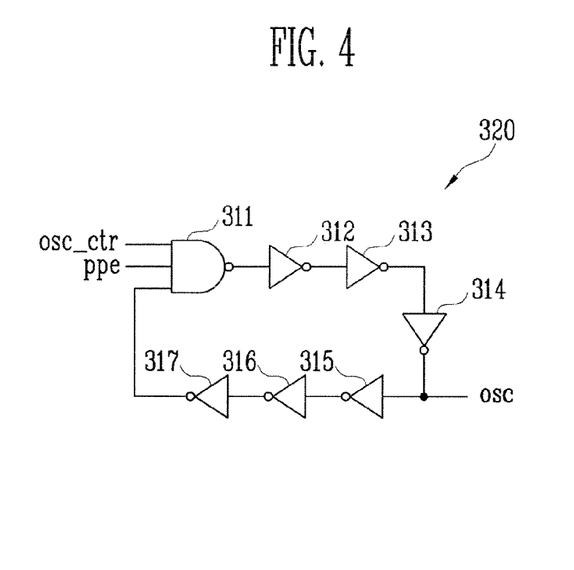
FIG. 4 is a detailed circuit diagram showing a ring oscillator of FIG. 3.

FIG. 4 is a detailed circuit diagram of the ring oscillator 320 shown in FIG.3. The ring oscillator 320 is composed of a NAND gate 311, and inverter chains 312 to 317 of a ring structure.

Referring to FIG. 4, the NAND gate 311 performs a NAND operation on the oscillation control signal osc_ctr, the oscillator driving signal ppe, and a feedback signal. The inverter chains 312 to 314 delay the output signal of the NAND gate 311 to output the oscillation signal osc. The inverter chains 315 to 317 delay the oscillation signal osc, and then feedback it to the input of the NAND gate 411.

At this time, the oscillator driving signal ppe is at a LOW level in normal times, but shifts to a HIGH level in a period where charge pumping has to be performed. The oscillation control signal osc_ctr is at a HIGH level in normal times, but shifts to a LOW level at a time point where charge pumping must be stopped, thus stopping an oscillation operation. Thereafter, if the oscillator driving signal ppe shifts to a LOW level, the oscillation control signal osc_ctr shifts to a HIGH level again, and is then initialized in preparation for a next pumping operation.

Figure 5:
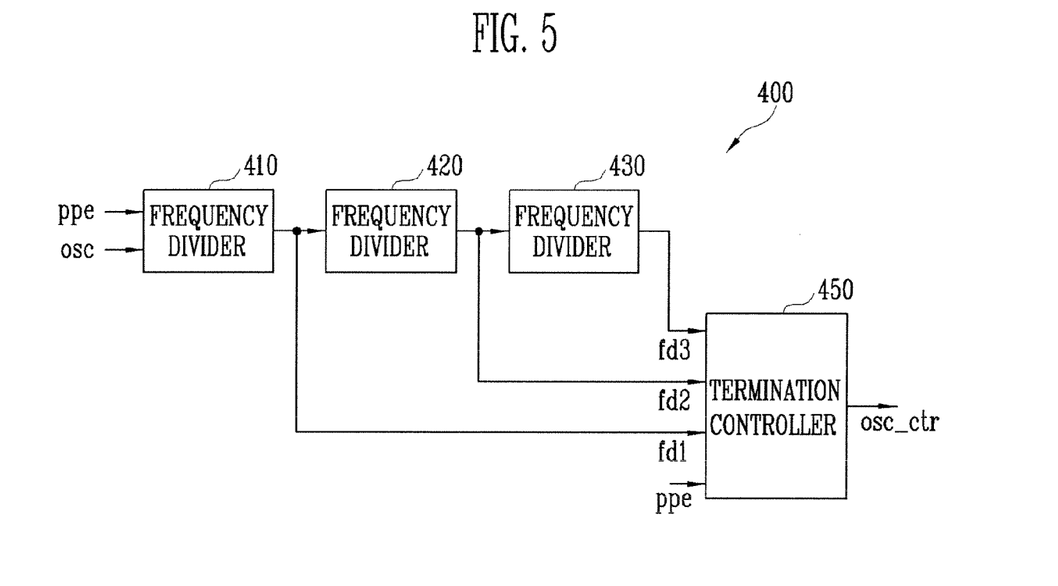
FIG. 5 is a detailed block diagram illustrating an oscillator controller of FIG. 3.

FIG. 5 is a detailed circuit diagram of the oscillator controller 400 shown in FIG.3. The oscillator controller 400 includes a plurality of frequency dividers 410 to 430 and a termination controller 450.

Referring to FIG. 5, the plurality of frequency dividers 410 to 430 make the frequency of the oscillation signal osc by half, and thus output first oscillation number control signals fd1 to fd3 the cycles of which are twice, four times and eight times of the cycle of an oscillation signal. The termination controller 450 outputs the oscillation control signal osc_ctr for stopping the oscillation operation of the ring oscillator 320 at a predetermined time point in a period where the oscillator driving signal ppe is at a HIGH level in response to the first oscillation number control signals fd1 to fd3 having a different cycle.

Figure 6:
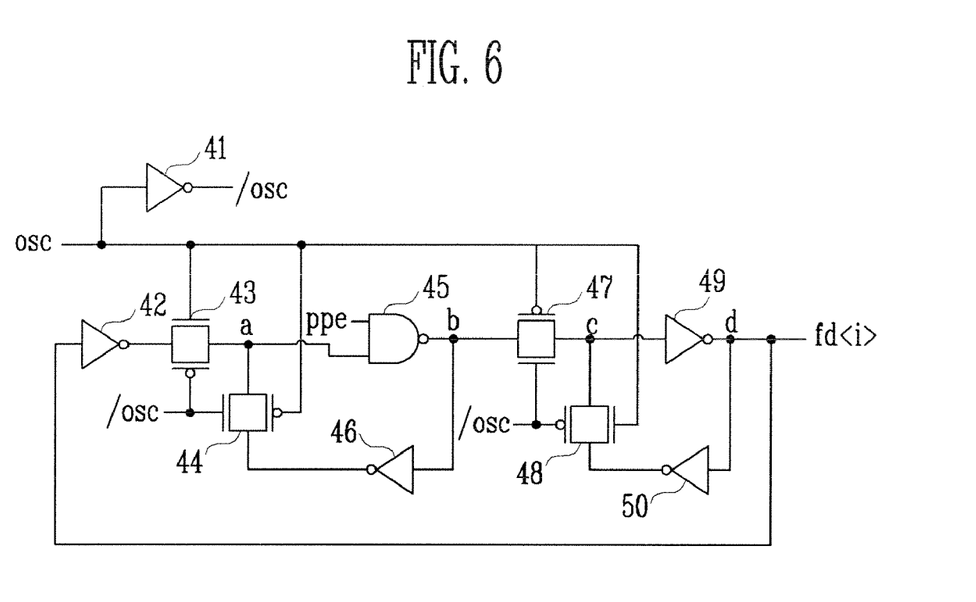
FIG. 6 is a detailed circuit diagram of each of frequency dividers shown in FIG. 5.

FIG. 6 is a detailed circuit diagram of each of the frequency dividers shown in FIG. 5. The frequency divider includes inverters 41, 42, transfer gates 43, 44, a NAND gate 45, an inverter 46, transfer gates 47, 48, and inverters 49, 50.

The inverter 41 inverts the oscillation signal osc and outputs an oscillation bar signal /osc. The inverter 42 inverts a first oscillation number control signal fd<i> being a signal of a node d. Te transfer gate 43 transfers the output signal of the inverter 42 to a node a under the control of the oscillation signal osc and the oscillation bar signal /osc. The NAND gate 45 performs a NAND operation on the signal of the node a and the oscillator driving signal ppe, and then outputs the results to a node b. The inverter 46 inverts the signal of the node b. The transfer gate 44 transfers the output signal of the inverter 46 to the node a under the control of the oscillation signal osc and the oscillation bar signal /osc. The transfer gate 47 transfers the signal of the node b to a node c under the control of the oscillation signal osc and the oscillation bar signal /osc. The inverter 49 inverts the signal of the node c and then outputs the inverted signal to the node d. The inverter 50 inverts the signal of the node d. The transfer gate 48 transfers the output signal of the inverter 50 to the node c under the control of the oscillation signal osc and the oscillation bar signal /osc.

The operation of the frequency divider will now be described.

Since the oscillator driving signal ppe is at a LOW level in normal time, the node b becomes a HIGH level. Assuming that an initial value of the oscillation signal osc is at a LOW level, the transfer gate 47 is turned on and the signal (HIGH level) of the node b is thus transferred to the node c. The signal of the node c is transferred to the node d (LOW level) through the inverter 49. The initial value of the node d, i.e., the initial value of the output signal fd<in> of the frequency divider becomes a LOW level. At this time, the transfer gate 43 is turned off and does not transfer the signal of the node d to the node a. The transfer gate 44 is turned on so that a latch is formed by the NAND gate 45, the inverter 46 and the transfer gate 44, and the transfer gate 48 is turned off.

If charge pumping begins, the oscillator driving signal ppe becomes a HIGH level, and the NAND gate 45 simply serves as an inverter. At this time, if the oscillation signal osc shifts to a HIGH level, the transfer gates 43, 48 are turned on and the transfer gates 44, 47 are turned off. Thus, the LOW level of the node d is transferred up to the node b through the inverter 42, the transfer gate 43 and the NAND gate 45. The level of the first oscillation number control signal fd<i> does not vary. Then, if the oscillation signal osc shifts from the HIGH level to a LOW level, the transfer gates 43, 48 is turned off, and the transfer gates 44, 47 are turned on. Thus, the LOW level of the node b is transferred to the node d through the inverter 49, and the first oscillation number control signal fd<i> shifts to a HIGH level.

Through this operation, the frequency divider generates the first oscillation number control signals fd<i>, which shifts at a falling edge of the oscillation signal osc. The cycle of the first oscillation number control signal fd<i> formed thus becomes twice, four times or eight times of the oscillation signal osc.

Figure 7:
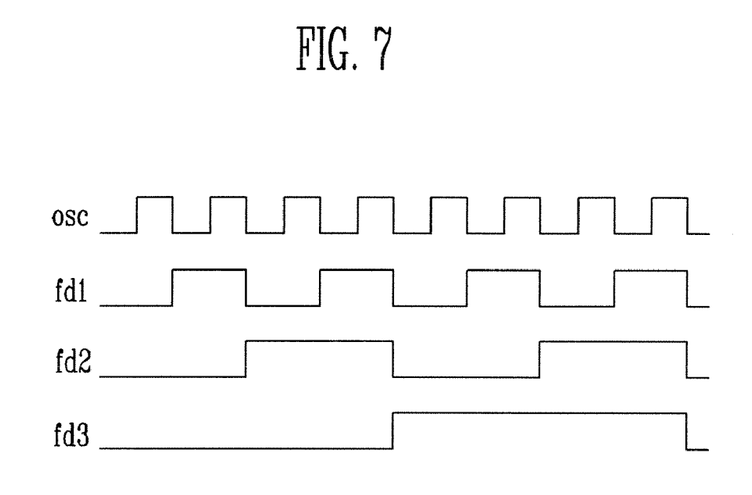
FIG. 7 is a waveform showing signals output from the frequency divider of FIG. 6.

FIG. 7 shows a waveform of the oscillation signal osc and the first oscillation number control signals fd1 to fd3. The first oscillation number control signal fd1 has the cycle of twice of the oscillation signal osc, the first oscillation number control signal fd2 has the cycle of four times of the oscillation signal osc, and the first oscillation number control signal fd3 has the cycle of eight times of the oscillation signal osc.

Figure 8:
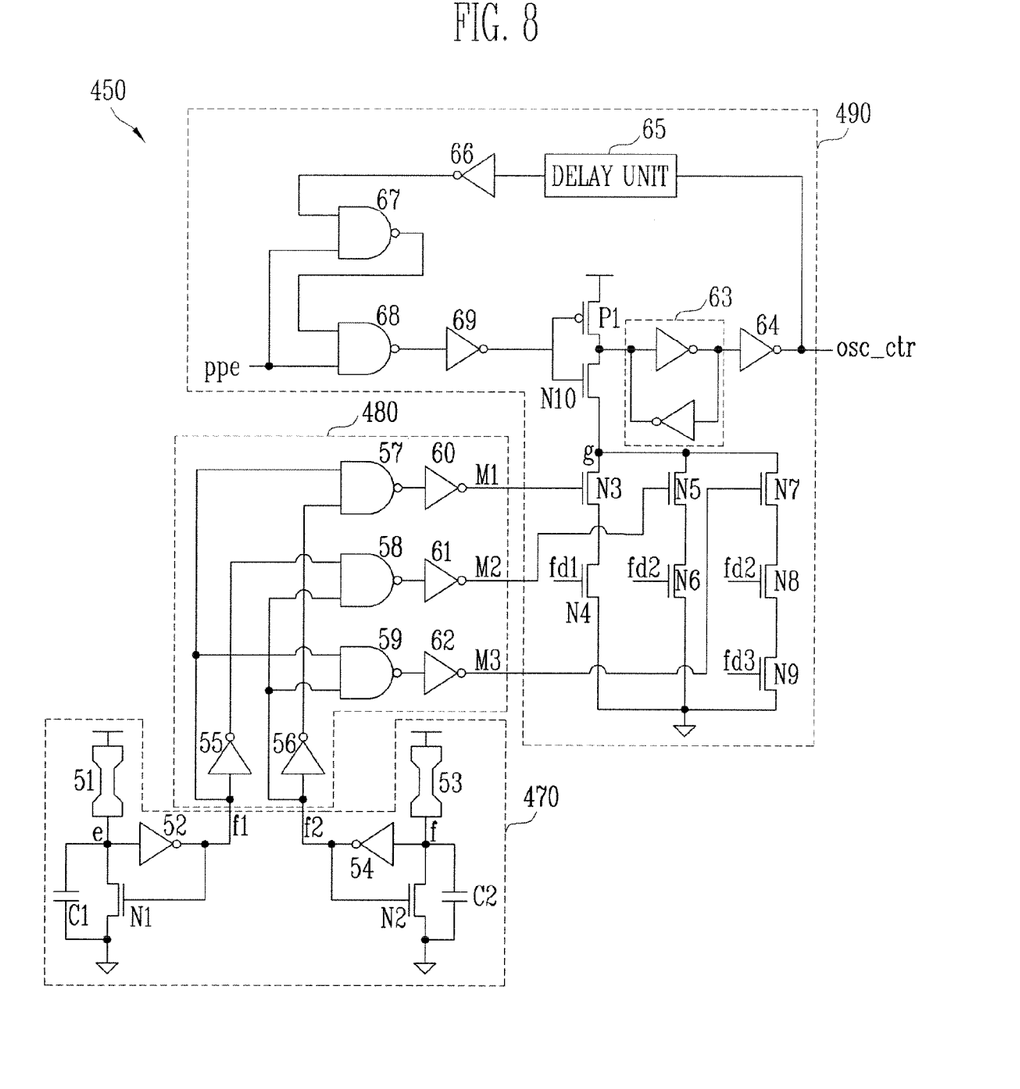
FIG. 8 is a detailed circuit diagram of a termination controller shown in FIG. 5

FIG. 8 is a detailed circuit diagram of the termination controller 450 shown in FIG. 5. The termination controller 450 includes an oscillation decision unit 470, an oscillation number controller 480, and an oscillation controller 490. The oscillation decision unit 470 generates oscillation decision signals f1, f2 for deciding the number of charge pumping according to cutting of a fuse.

Referring to FIG. 8, the oscillation decision unit 470 comprises fuses 51, 53, inverters 52, 54, capacitors C1, C2, and NMOS transistors N1, N2. The fuse 51 has one end connected to a power source voltage and the other end connected to a node e. The fuse 53 has one end connected to a power source voltage and the other end connected to a node f. The inverter 52 inverts a signal of the node e and thus outputs an oscillation decision signal f1. The inverter 54 inverts a signal of the node f and thus outputs an oscillation decision signal f2. The NMOS transistor N1 is connected in parallel to the capacitor C1, and the NMOS transistor N2 is connected in parallel to the capacitor C2. The NMOS transistor N1 is connected between the node e and a ground voltage, and has a gate to which the oscillation decision signal f1 is input. The NMOS transistor N2 is connected between the node f and the ground voltage, and has a gate to which the oscillation decision signal f2 is input. The capacitor C1 is connected between the node e and the ground voltage, and the capacitor C2 is connected between the node f and the ground voltage.

The operation of the oscillation decision unit 470 will now be described. The fuses 51, 53 are connected in normal times, and are cut, if needed. For example, if it is not necessary to control the charge pumping operation number (time) of the internal voltage generator, both the oscillation decision signals f1, f2 keep a LOW level since the fuses 51, 53 are connected. Since the initial value of the oscillator driving signal ppe is also at a LOW level, the oscillation control signal osc_ctr has an initial value of a HIGH level. In this case, the ring oscillator 320 operates in the same manner as the prior art.

If it is necessary to reduce the charge pumping operation number (period), one or all of the fuses 51, 53 have to be cut. The levels of the oscillation decision signals f1, f2 are determined depending upon the cutting of the fuses 51, 53. If the fuse 51 is cut, the oscillation decision signal f1 becomes a HIGH level and the oscillation decision signal f2 becomes a LOW level. If the fuse 52 is cut, the oscillation decision signal f2 becomes a HIGH level and the oscillation decision signal f1 becomes a LOW level. If both the fuses 51, 52 are cut, both the oscillation decision signals f1, f2 become a HIGH level.

The charge pumping number (time) can be decided according to cutting of these fuses 51, 53. The pumping number can be also changed according to an externally input command instead of the fuses 51, 53.

Referring back to FIG. 8, the oscillation number controller 480 serves to decode the oscillation decision signals f1, f2, and thus to generate second oscillation number control signals M1 to M3. The oscillation number controller 480 includes inverters 55, 56, NAND gates 57 to 59, and inverters 60 to 62.

The inverter 55 inverts the oscillation decision signal f1, and the inverter 56 inverts the oscillation decision signal f2. The NAND gate 57 performs a NAND operation on the oscillation decision signal f1 and the output signal of the inverter 56, and the NAND gate 58 performs a NAND operation on the oscillation decision signal f2 and the output signal of the inverter 55. The NAND gate 59 performs a NAND operation on the oscillation decision signals f1, f2. The inverter 60 inverts the output signal of the NAND gate 57 and thus outputs the second oscillation number control signal M1. The inverter 61 inverts the output signal of the NAND gate 58 and thus outputs the second oscillation number control signal M2. The inverter 62 9 inverts the output signal of the NAND gate 59 and thus outputs the second oscillation number control signal M3.

If it is predetermined that a charge pump performs pumping only once, the second oscillation number control signal M1 is at a HIGH level. If it is predetermined that the charge pump performs pumping only twice, the second oscillation number control signal M2 is at a HIGH level. If it is predetermined that the charge pump performs pumping only sixth times, the second oscillation number control signal M3 is at a HIGH level.

Referring again to FIG. 8, the oscillation controller 490 generates the oscillation control signal osc_ctr for stopping the oscillation operation of the ring oscillator by using the first oscillation number control signals fd1 to fd3 and the second oscillation number control signals M1 to M3 in a period where the oscillator driving signal ppe is at a HIGH level. This oscillation controller 490 includes a PMOS transistor P1, a NMOS transistor N10, a latch circuit 63, inverters 64, 66 and 69, NAND gates 67, 68, a delay unit 65, and NMOS transistors N3 to N9.

The PMOS transistor P1 and the NMOS transistor N10 are connected between a power source voltage and a node g in a serial manner. The latch circuit 63 latches a signal transferred through the PMOS transistor P1 or the NMOS transistor N10. The inverter 64 inverts the latched signal and thus outputs the oscillation control signal osc_ctr. The oscillation control signal osc_ctr is input to the delay unit 65, and an output signal of the delay unit 65 is inverted by the inverter 66. An output signal of the inverter 66 and the oscillator driving signal ppe are input to the NAND gate 67, and an output signal of the NAND gate 67 and the oscillator driving signal ppe are input to the NAND gate 68. An output signal of the NAND gate 68 is inverted by the inverter 69, and an output signal of the inverter 69 is input to the gates of the PMOS transistor P1 and the NMOS transistor N10. The NMOS transistors N3, N4 are serially connected between the node g and a ground voltage. The NMOS transistors N5, N6 are also serially connected between the node g and the ground voltage. The NMOS transistors N7, N8 and N9 are also connected between the node g and the ground voltage in a serial manner. The NMOS transistors N3, N4, the NMOS transistors N5, N6, and the NMOS transistors N7, N8 and N9 are connected in parallel to one another.

The operation of the oscillation controller 490 will be below described with reference to FIG. 7. In the case where it is predetermined that a charge pump performs pumping only once, if the second oscillation number control signal M1 is input as a HIGH level with the oscillator driving signal ppe being input as a HIGH level, the NMOS transistor N2 is turned on. Initially, since the first oscillation number control signal fd1 is at a LOW level, the NMOS transistor N4 is turned off, and the oscillation control signal osc_ctr keeps a HIGH level. In a while, after the oscillation signal osc is toggled once (one cycle) as shown in FIG. 7, if the first oscillation number control signal fd1 becomes a HIGH level, the NMOS transistor N4 is turned on, and the oscillation control signal osc_ctr is output as a LOW level. If the control signal osc_ctr becomes a LOW level, the ring oscillator stops the oscillation operation, and the charge pump 340 does not perform charge pumping any more. Thereafter, although the first oscillation number control signal fd1 shifts to a LOW or HIGH level, the oscillation control signal osc_ctr keeps the LOW level. In this case, the charge pump performs the charge pumping operation only once and then stops the charge pumping operation.

In the case where it is predetermined that a charge pump performs pumping twice, the second oscillation number control signal M2 is input as a HIGH level with the oscillator driving signal ppe being input as a HIGH level, the NMOS transistor N5 is turned on. After the oscillation signal osc is toggled twice (two cycles) as shown in FIG. 7, if the first oscillation number control signal fd2 becomes a HIGH level, the NMOS transistor N6 is turned on, and the oscillation control signal osc_ctr is output as a LOW level. In this case, the charge pump performs the charge pumping operation only twice and then stops the charge pumping operation.

In the case where it is predetermined that a charge pump performs pumping six times, the second oscillation number control signal M3 is input as a HIGH level with the oscillator driving signal ppe being input as a HIGH level, the NMOS transistor N7 is turned on. At a time point where the first oscillation number control signals fd2, fd3 become a HIGH level at the same time, the oscillation control signal osc_ctr becomes a LOW level. Therefore, after the oscillation signal osc is toggled six times (six cycles) as shown in FIG. 7, the first oscillation number control signal fd2 becomes a HIGH level. Therefore, the NMOS transistor N9 is first turned on, and the NMOS transistor N8 is then is turned on. Thus, the oscillation control signal osc_ctr is output as a LOW level. In this case, the charge pump performs the pumping only six times and then stops the charge pumping operation.

In the above, if the internal voltage VPP is not higher than a target voltage, the oscillator driving signal ppe continues to keep active, for examppe, a HIGH level. The oscillation control signal osc_ctr, which has been output as a LOW level, is feedbacked through the delay unit 65, the inverter 66, and the NAND gates 67 and 68. Consequently, the feedbacked oscillation control signal osc_ctr and the oscillator driving signal ppe are logically combined. Thus, the oscillation control signal osc_ctr is activated again, and the charge pumping operation is performed again through the above operation until the internal voltage VPP becomes higher than the target voltage.

In addition, the pumping number of the charge pump can be controlled by generating a greater number of first oscillation number control signals though the addition of a greater number of frequency dividers. Further, the pumping number of the charge pump can be changed in a wafer state or finished good state.

Figure 9:
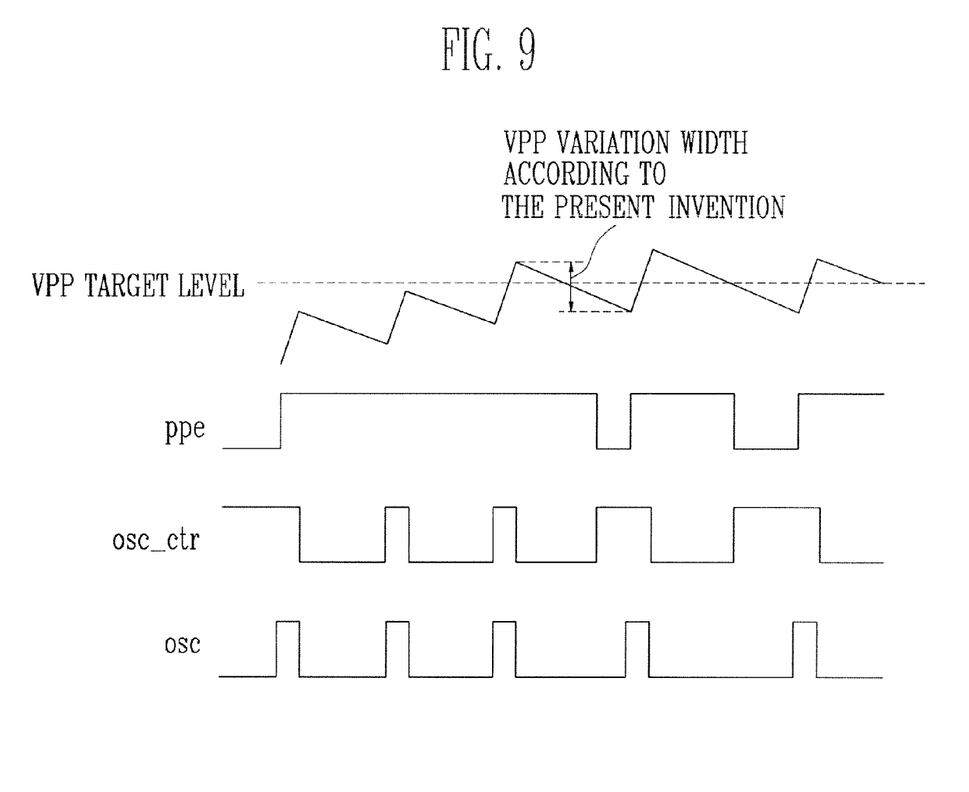
FIG. 9 is a waveform showing variation in the level of an internal voltage generated from the internal voltage generator shown in FIG. 3.

FIG. 9 is a waveform showing variation in the level of an internal voltage generated from the internal voltage generator shown in FIG. 3.

As shown in FIG. 9, the internal voltage generator of the present invention performs the charge pumping operation only predetermined number of times if the oscillator driving signal ppe of the level detector is activated, and stops the charge pumping operation thereafter. Further, if the internal voltage VPP does not become higher than a target voltage, the internal voltage generator performs the charge pumping operation again only predetermined number of times.

In the prior art, if the internal voltage VPP becomes higher than a target voltage, the charge pumping operation is stopped, and if the internal voltage VPP becomes lower than a target voltage, the charge pumping operation is carried out again. Thus, while the internal voltage VPP and the target voltage are compared, the charge pumping operation continues, so that the internal voltage VPP may become much higher than the target voltage. In the present invention, however, as described above, if the oscillator driving signal ppe of the level detector is activated, the charge pumping operation is performed only predetermined number of times, and if the internal voltage VPP does not become higher than a target voltage, the charge pumping operation is performed again only predetermined number of times. Accordingly, the internal voltage VPP can be prevented from becoming much higher than a target voltage, and a peak-peak value of the internal voltage VPP can be minimized.

The charge pumping operation is performed through the driving of the ring oscillator in a period where the oscillator driving signal is at a HIGH level in an active operation. In a standby operation, however, even when the oscillator driving signal is at a HIGH level, the operation of the ring oscillator is stopped, and the charge pumping operation is thus stopped.

Even in the case where the same internal voltage generator is used in the active operation and the standby operation, and the case where the internal voltage generator used in the active operation and the internal voltage generator used in the standby operation are separately used, the oscillation operation of the ring oscillator is stopped even in the period where the oscillator driving signal is at a HIGH level only in the standby operation, and the charge pumping operation is stopped.

As described above, according to the present invention, charge pumping is performed at a desired time point of a period where the oscillator driving signal is at a HIGH level or only predetermined number of times, and if an internal voltage does not becomes higher than a target voltage, charge pumping is performed again only predetermined number of times. Accordingly, an unwanted over pumping period of the internal voltage generator can be reduced.

Further, since the over pumping period is reduced, the variation width in the level of an internal voltage VPP can be reduced. Therefore, the disclosed internal voltage generator can generate a stabilized voltage level.

Although the foregoing description has been made with reference to the preferred embodiments, it is to be understood that changes and modifications may be made by the ordinary skilled in the art without departing from the spirit and scope of this disclosure and the appended claims.

What is claimed is:

1. An internal voltage generator comprising:
  a ring oscillator for generating an oscillation signal;
  a charge pump for generating an internal voltage in response to the oscillation signal;
  a level detector for detecting a level of the internal voltage and outputting an oscillator driving signal to the ring oscillator; and
  an oscillator control unit for generating an oscillation control signal in response to the oscillation signal and the oscillator driving signal;
  wherein the oscillation control signal controls frequency of the pulse signal during an activation of the oscillator driving signal.

2. The internal voltage generator of claim 1, wherein:
  the level detector activates the oscillator driving signal again if the internal voltage is lower than a target voltage even after the charge pumping operation is performed as many as the number of times that the oscillation signal is generated, and
  the charge pump performs the charge pumping operation as many as the number of times that the oscillation signal is generated, which is generated again according to the oscillator driving signal and the oscillation control signal.

3. The internal voltage generator as claimed in claim 1, wherein the ring oscillator comprises:
  a logic element for logically combining the oscillator driving signal and the oscillation control signal; and inverter chains which are arranged in an output terminal and an input terminal of the logic elements in a ring structure.

4. The internal voltage generator as claimed in claim 1, wherein the oscillator controller inactivates the oscillation control signal after the oscillation signal is toggled N times even in the period where the oscillator driving signal is activated.

5. The internal voltage generator as claimed in claim 1, wherein the charge pump stops the charge pumping operation after performing the charge pumping operation N times in response to the oscillation control signal even in the period where the oscillator driving signal is activated.

6. The internal voltage generator as claimed in claim 1, wherein the oscillator controller comprises:
   a plurality of frequency divider for generating a plurality of first oscillation number control signals, respectively, having different cycles in response to the oscillation signal, and
   a termination controller for controlling an activation time of the oscillation control signal in response to one of the plurality of first oscillation number control signals after the oscillator driving signal is activated.

7. The internal voltage generator as claimed in claim 6, wherein the plurality of frequency dividers shift the first oscillation number control signals at a falling edge of the oscillation signal.

8. The internal voltage generator as claimed in claim 6, wherein the plurality of frequency dividers comprise:
   first and second transfer gates, which are turned on when the oscillation signal is received as a HIGH level, and are turned off when the oscillation signal is received as a LOW level; and
   third and fourth transfer gates, which are turned off if the oscillation signal is received as a HIGH level, and are turned on if the oscillation signal is received as a LOW level.

9. The internal voltage generator as claimed in claim 6, wherein the termination controller comprises:
   an oscillation decision unit for generating a plurality of oscillation decision signals for deciding a charge pumping operation number according to a cutting of fuses;
   an oscillation number controller for decoding the oscillation decision signal to generate a plurality of second oscillation number control signals; and
   an oscillation controller for controlling the activation time of the oscillation control signal in response to one of the plurality of first oscillation number control signals and one of the plurality of second oscillation number control signals in the period where the oscillator driving signal is activated.

10. The internal voltage generator as claimed in claim 9, wherein the oscillation decision unit generates the plurality of oscillation decision signals according to an externally input command.

11. The internal voltage generator as claimed in claim 9, wherein the oscillation controller inactivates the oscillation control signal if one of the plurality of second oscillation number control signals is activated and one of the plurality of first oscillation number control signals is activated after the oscillation signal is toggled N times.

12. An internal voltage generator comprising:
    a level detector for detecting a level of an internal voltage;
    a ring oscillator for performing an oscillation operation;
    a charge pump circuit for performing a charge pumping operation to generate the internal voltage; and
    an oscillator controller for generating an oscillation control signal for stopping the oscillation operation of the ring oscillator by using an output signal of the level detector and an output signal of the ring oscillator such that the number of the charge pumping operation is limited to a target number after the output signal of the level detector is activated.

13. The internal voltage generator of claim 12, wherein:
    the level detector activates the oscillator driving signal again if the internal voltage is lower than a target voltage even after the charge pumping operation is performed as many as the number of times that the oscillation signal is generated, and
    the charge pump performs the charge pumping operation as many as the number of times that the oscillation signal is generated, which is generated again according to the oscillator driving signal and the oscillation control signal.

14. The internal voltage generator as claimed in claim 12, wherein the ring oscillator comprises:
    a logic element for logically combining the output signal of the level detector and the oscillation control signal; and
    inverter chains which are arranged in an output terminal and an input terminal of the logic elements in a ring structure.

15. The internal voltage generator as claimed in claim 12, wherein the charge pump circuit stops the charge pumping operation after raising the internal voltage by performing the charge pumping operation only target times in response to the oscillation signal even in the period where the output signal of the level detector is activated.

16. The internal voltage generator as claimed in claim 12, wherein the oscillator controller inactivates the oscillation control signal after the output signal of the ring oscillator is toggled N times even in the period where the output signal of the level detector is activated.

17. The internal voltage generator as claimed in claim 12, wherein the oscillator controller comprises:
    a plurality of frequency divider for generating a plurality of first oscillation number control signals, respectively, having different cycles in response to the oscillation signal, and
    a termination controller for controlling an activation time of the oscillation control signal in response to one of the plurality of first oscillation number control signals after the oscillator driving signal is activated.

18. The internal voltage generator as claimed in claim 17, wherein the plurality of frequency dividers shift the first oscillation number control signals at a falling edge of the oscillation signal.

19. The internal voltage generator as claimed in claim 17, wherein the plurality of frequency dividers comprise:
    first and second transfer gates, which are turned on when the output signal of the ring oscillator is received as a HIGH level, and are turned off when the output signal of the ring oscillator is received as a LOW level; and
    third and fourth transfer gates, which are turned off if the output signal of the ring oscillator is received as a HIGH level, and are turned on if the output signal of the ring oscillator is received as a LOW level.

20. The internal voltage generator as claimed in claim 17, wherein the termination controller comprises:
    an oscillation decision unit for generating a plurality of oscillation decision signals for deciding a charge pumping operation number according to a cutting of fuses;

an oscillation number controller for decoding the oscillation decision signal to generate a plurality of second oscillation number control signals; and an oscillation controller for controlling the activation time of the oscillation control signal in response to one of the plurality of first oscillation number control signals and one of a plurality of second oscillation number control signals in the period where the output signal of the level detector is activated.

21. The internal voltage generator as claimed in claim 20, wherein the oscillation decision unit generates the plurality of oscillation decision signals according to an externally input command.

22. The internal voltage generator as claimed in claim 20, wherein the oscillation controller inactivates the oscillation control signal if one of the plurality of second oscillation number control signals is activated and one of the plurality of first oscillation number control signals is activated after the output signal of the ring oscillator is toggled N times.

* * * * *